(12) United States Patent
Fortner et al.

(10) Patent No.: US 8,141,430 B2
(45) Date of Patent: Mar. 27, 2012

(54) MONOLITHIC VACUUM MANOMETER UTILIZING ELECTROSTATIC INTERFERENCE AS A MEANS OF DETECTION

(75) Inventors: Michael W. Fortner, Plano, TX (US); Joseph Sipka, McKinney, TX (US); Christopher Reed, McKinney, TX (US)

(73) Assignee: Brooks Instrument, LLC, Hatfield, PA (US)

( * ) Notice: Subject to any disclaimer, the term of this patent is extended or adjusted under 35 U.S.C. 154(b) by 87 days.

(21) Appl. No.: 12/827,531

(22) Filed: Jun. 30, 2010

(65) Prior Publication Data

US 2011/0000303 A1 Jan. 6, 2011

Related U.S. Application Data

(60) Provisional application No. 61/222,184, filed on Jul. 1, 2009.

(51) Int. Cl.
*G01L 9/12* (2006.01)
*H05K 13/00* (2006.01)

(52) U.S. Cl. ......... 73/718; 73/724; 361/283.4; 29/592.1
(58) Field of Classification Search ........................ None
See application file for complete search history.

(56) References Cited

U.S. PATENT DOCUMENTS

| | | | |
|---|---|---|---|
| 4,823,603 A * | 4/1989 | Ferran et al. | 73/724 |
| 6,701,790 B2 | 3/2004 | Fortner et al. | |
| 6,734,659 B1 | 5/2004 | Fortner | |
| 6,910,381 B2 | 6/2005 | Albert et al. | |
| 7,010,983 B2 | 3/2006 | Albert et al. | |
| 7,490,518 B2 | 2/2009 | Albert et al. | |

* cited by examiner

*Primary Examiner* — Andre Allen
(74) *Attorney, Agent, or Firm* — Patton Boggs, LLP

(57) ABSTRACT

A monolithic manometer and method of sensing pressure changes may include sensing a change in parasitic capacitive coupling between multiple parasitic capacitive coupled conductive elements in response to a diaphragm disturbing the parasitic capacitive coupling between the conductive elements. A signal representative of the sensed change in parasitic capacitive coupling may be output.

30 Claims, 7 Drawing Sheets

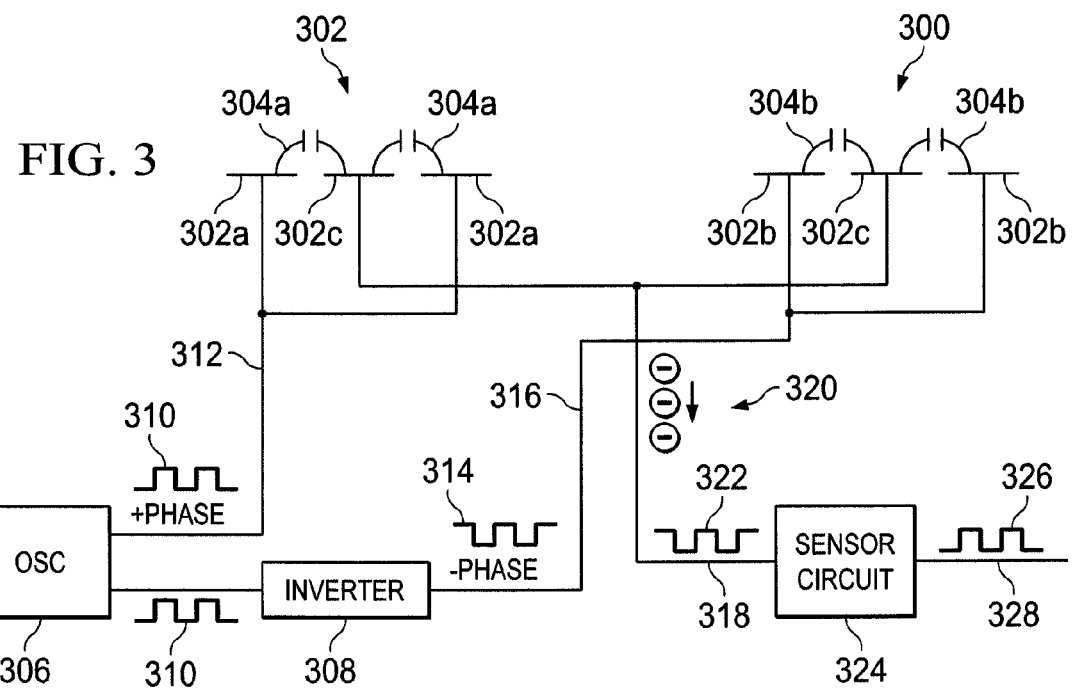
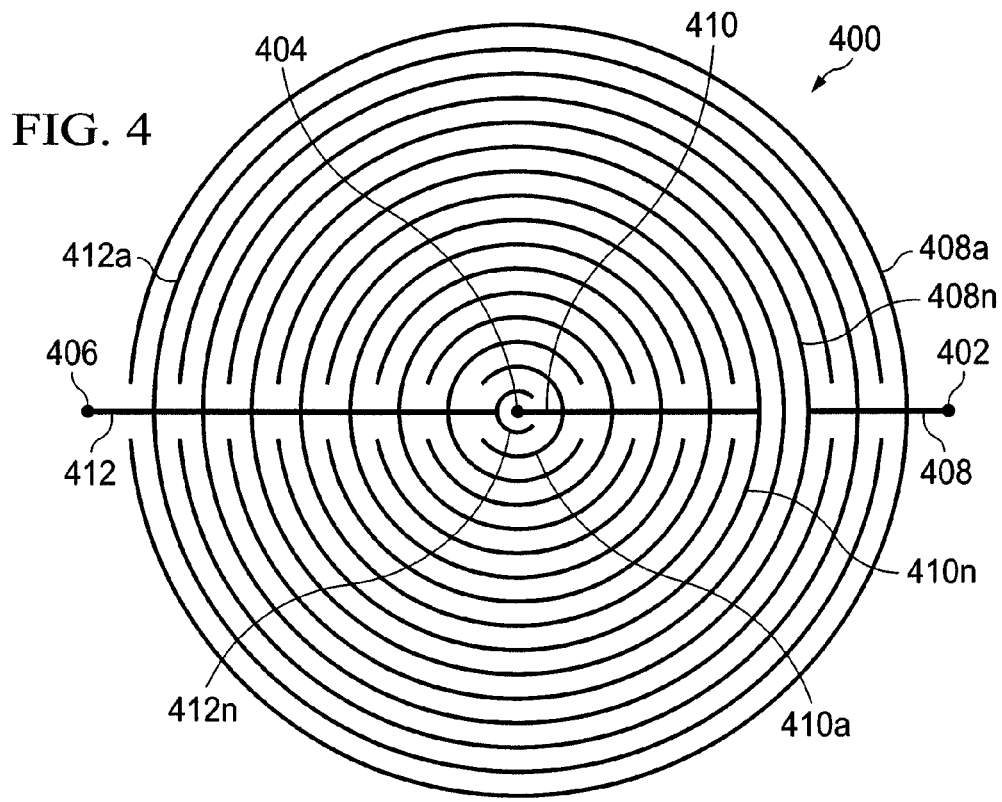

MONOLITHIC VACUUM MANOMETER UTILIZING ELECTROSTATIC INTERFERENCE AS A MEANS OF DETECTION

CROSS-REFERENCE TO RELATED APPLICATIONS

This application for patent claims priority from U.S. Provisional Application Ser. No. 61/222,184, filed Jul. 1, 2009; the entire teachings of which are incorporated herein by reference in its entirety.

BACKGROUND OF THE INVENTION

Many industrial processes may only be performed at low pressures. Such processes include, but are not limited to, semiconductor manufacturing, micro machining, vacuum deposition, and specialized coatings. In many such processes, pressure regulation is critical in order to maintain environmental conditions (e.g., temperature and pressure), a manometer, which is a type of pressure sensor, may be utilized. The manometer is configured to sense pressure changes in a process chamber that has reduced pressure.

One type of manometer that is sensitive enough to measure pressures as such low pressures is a diaphragm-based manometer. Diaphragm-based manometers are widely used in the semiconductor industry. In part, this is because diaphragm-based manometers are typically well suited to the corrosive services of this industry due to having high accuracy and being resistant to contamination. In particular, diaphragm-based manometers exhibit enhanced resistance to contamination and operate longer without maintenance.

A manometer serves as the vacuum/pressure sensing element and may be used to measure and/or control the pressure within a process chamber. A diaphragm-based manometer typically has a housing containing two chambers separated by a circular tensioned diaphragm. The first chamber is in fluid communication with the process chamber or other assembly in which the pressure is to be measured. The second chamber of the diaphragm-based manometer is commonly referred to as the reference chamber and is typically (although not necessarily) evacuated and sealed at a pressure that is substantially less than the minimum pressure the sensor senses.

A diaphragm, which is generally circular, is tensioned and separates the two chambers within a housing of the diaphragm-based manometer. The diaphragm is essentially formed of a thin metal that is mechanically constrained about its periphery. The diaphragm reacts to differential pressures by deforming into a bowed shape with the periphery remaining stationary. The diaphragm, thereby, serves as a flexing, grounded electrode. The diaphragm deforms as a reaction to the pressure difference across it and also interacts with electrostatic fields such that the deformation of the diaphragm may be resolved through these electrostatic interactions.

In close proximity to the diaphragm lies an electrode assembly. This assembly generally includes a stiff platform with a polished, electrically insulating surface that bears two conductive electrodes. The conductive electrodes are typically silk screen painted onto the surface, which is often a ceramic base. The configuration of the conductive electrodes of conventional diaphragm-based manometers generally includes an inner, solid circle and a ring that encircles the inner circle. The electrode assembly is mechanically constrained a fixed distance from the plane containing the periphery of the diaphragm so that the electrodes are very close to the diaphragm (<0.005 in) and run parallel to the surface of the diaphragm. Flexure of the diaphragm, due to applied pressure, can easily be computed by measuring the capacitance to ground at each electrode and subtracting one measurement from another.

Modern diaphragm-based manometers utilize two electrodes to monitor the flexure of the diaphragm. The capacitance to ground of the two electrodes ("common-mode capacitance") varies with flexure of the diaphragm, but also changes with movement of the electrode assembly. Such movement occurs with temperature changes, temperature transients, and mechanical loading. Measurements using the difference in capacitance of the two plates ("difference capacitance") are more stable since they reject motions between the diaphragm and electrodes and instead reflect the deflection of the diaphragm.

As the diaphragm is displaced, capacitance between the diaphragm and the conductive elements changes. The changing capacitance causes a change in charge being sensed from the two conductive elements, thereby providing a measurement to determine a change in pressure in the process chamber. The measured pressure change may be used for altering the environmental conditions by a controller of the vacuum chamber.

Diaphragm-based manometers are very precise. However, as a result, the manometers have components and tolerances that, too, are very precise. Generally speaking, there are a fair number of components in conventional diaphragm-based manometers that are used to (i) reduce temperature variation effects (e.g., thermal expansion and contraction) that impact repeatability of the manometer, (ii) reduce stray capacitance effects on measurement, (iii) reduce alignment variations of the components in the manometer, and so forth. As a result, the cost and production of the manometers are challenges that have plagued manufacturers for years. As an example, as thermal effects cause expansion and contraction of materials of the manometer, such as a metal housing and support hardware for the ceramic base, thermal cycles cause different readings at the same temperature on different sides of the thermal cycles as the materials themselves are slightly repositioned with respect to one another, even if formed of the same material, due to thermal conductivity rates not being identical. As understood, as a result of the production and repeatability issues, manufacturing diaphragm-based manometers is labor intensive and costly.

SUMMARY OF THE INVENTION

The principles of the present invention overcome many of the problems of conventional manometers by (i) using a monolithic design in which the base serves as the housing, thereby reducing thermal effects, (ii) using a glass coating on which conductive elements are formed using photolithographic processes, thereby improving sensitivity, (iii) electrostatically interfering with parasitic capacitance between the conductive elements by the diaphragm (as opposed to measuring changes in capacitance between the conductive elements and the conductive elements as performed by conventional manometers), thereby increasing sensitivity to pressure changes, and (iv) grounding a sensor circuit to the housing, thereby reducing stray capacitance effects and reducing complexity of the manometer. By using these structural and electrical configurations, and other manufacturing processes to manufacture the manometer, the manometer may be significantly less complex and less costly to produce, be capable of being produced in a large scale manufacturing process, and be less sensitive to environmental changes, thereby being more repeatable over time and being less expensive to manufacture.

One embodiment of a vacuum manometer may include a base including a side wall extending higher than a center portion including a top surface and a bottom surface. Multiple conductors may extend through openings defined by the center portion of the base. A glass coating may be attached to at least a portion of the top surface of the base. Conductive elements may be disposed on the glass coating and in electrical communication with said electrical conductors. A diaphragm may be connected to the side wall and extend over the conductive elements.

One embodiment of a method of sensing pressure changes may include sensing a change in parasitic capacitive coupling between multiple parasitic capacitively coupled conductive elements in response to a diaphragm disturbing an electrostatic field between the parasitic capacitively coupled conductive elements. A signal representative of the sensed change in parasitic capacitive coupling may be output.

Another embodiment of a vacuum manometer may include a monolithic base including a top surface and side wall extending higher than the top surface. Multiple conductive elements may be supported by the top surface of the base. A diaphragm may be connected to the side wall of the monolithic base and positioned above the conductive elements with respect to the top surface of the monolithic base. A cover may be configured to cover the base above the diaphragm.

One embodiment of an electrical circuit for measuring pressure changes on a vacuum manometer may include an oscillator generating an oscillating signal. An inverter may be electrically connected to the oscillator, and configured to invert the oscillating signal being generated by the oscillator. A first conductive element in electrical communication with the oscillator, the oscillating signal being applied to the first conductive element. A second conductive element may be in electrical communication with the inverter, where the inverted oscillating signal may be applied to the second conductive element. A third conductive element may be in parasitic capacitive coupling with the first and second conductive elements. Sensor circuitry may be in electrical communication with the third conductive element, and be configured to measure charge on the third conductive element.

One embodiment of a method of manufacturing a vacuum manometer may include receiving a base having a top surface including multiple conductors extending through the base and above the top surface of the base. A glass coating may be applied onto the top surface of the base. The glass coating may be flattened to form a flat glass surface. The flattening may cause the conductors to be altered such that respective exposed portions of the conductors are substantially co-planar with the flat glass surface. Multiple conductive elements may be applied onto the flat glass surface, the conductors being connected to respective conductors.

BRIEF DESCRIPTION OF THE DRAWINGS

A more complete understanding of the system and methods of the principles of the present invention may be obtained by reference to the following Detailed Description when taken in conjunction with the accompanying Drawings wherein:

FIG. 3 is a block diagram of illustrative circuitry in communication with conductors having parasitic capacitance coupling therebetween;

FIG. 4 is an illustration of illustrative conductor elements for use in sensing changes in pressure in a vacuum chamber;

DETAILED DESCRIPTION OF THE DRAWINGS

Figure 1:
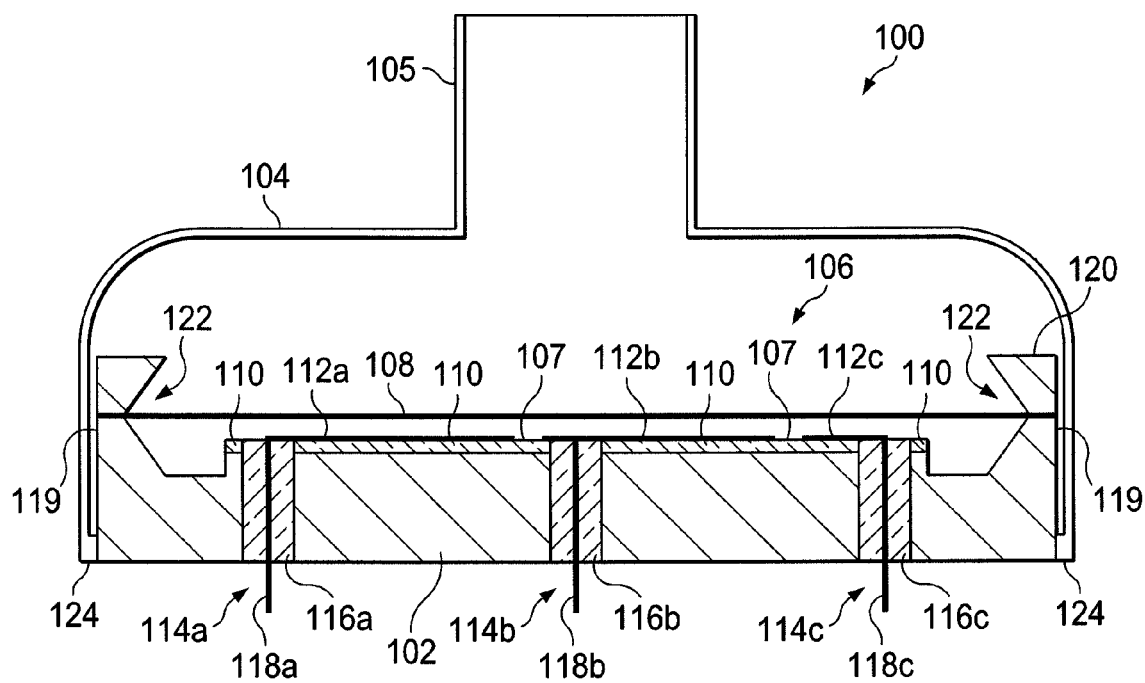
FIG. 1 is an illustration of an illustrative vacuum manometer configured to sense pressure changes in a vacuum chamber utilizing parasitic capacitive coupling.

With regard to FIG. 1, an illustration of an illustrative manometer 100 is shown to include a machined base 102 and cover 104. The machined base 102 may be a metallic base that is formed of a pure metal or composite alloy. In one embodiment, the machined base 102 has a low thermal coefficient of expansion. The machined base 102 may use a metal alloy, such as Inconel® alloy produced by Special Metals Corporation of New Hartford, N.Y. The cover may be metallic and, also, may be Inconel® alloy material. The cover 104 is shown to include a tube 105 to which another tube or other element may be connected to a vacuum chamber so that the manometer 100 may sense pressure changes in the vacuum chamber. By having each of the components of the manometer, including the base 102 and cover 104, be the same material, the manometer 100 is considered to be monolithic. Because the manometer 100 is monolithic, the manometer 100 has significantly fewer repeatability and operational problems as conventional non-monolithic manometers.

The machined base 102 may include a mesa section 106 that has a top surface 107. A diaphragm 108 may also be formed of a metal or metal alloy, such as Inconel® alloy, as previously described herein above. A glass-coated, insulating layer 110 may be disposed on the top surface 107 of the mesa 106 of the base 102. The glass coating 110 may be connected to the top surface 107 and may have conductive elements or conductors 112a-112c (collectively 112) to deposited thereon using vapor deposition and photolithography processes, as understood in the art.

Glass feed-throughs 114a-114c (collectively 114) may be extended through openings defined by the mesa 106 of the base 102. The glass feed-throughs 114 include glass elements 116a-116c (collectively 116) and conductors 118a-118c (collectively 118) that extend through the mesa section 106 of the base 102. In one embodiment, the glass feed-throughs are created using a powdered form of glass and processed by heating or otherwise to form glass frits in the openings. The conductors 118 may be used to connect conductive elements 112 to sensor circuitry (see, FIG. 5).

The base 102 also includes sidewall 119 that extends higher than the mesa section 106 to enable the diaphragm 108 to be connected thereto and pass over the conductors 112 supported by the mesa section 106. A canted ring 120 may be disposed above the sidewall 119 and enable the diaphragm 108 to be connected and sandwiched between the canted ring 120 and sidewall 119 at connection point 122. In one embodiment, the manometer 100 has a circular base 102 that uses a circular diaphragm. A seal 124 may be a welding directly connecting the base 102 and cover 104.

Figure 2:
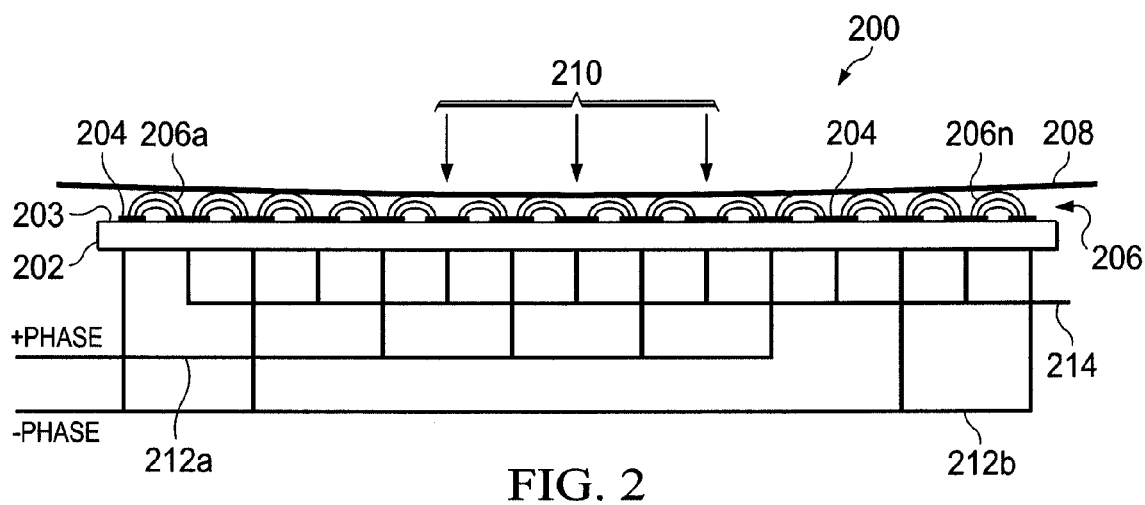
FIG. 2 is an illustration of an illustrative base having conductive elements disposed thereon, and having parasitic capacitive coupling between the conductive elements.

With regard to FIG. 2, an illustration of an illustrative portion 200 of a manometer is shown to describe operation of the manometer. A top surface 202 of a base is shown to include a glass coating 203 that is connected to the top surface 202. It should be understood that a coating other than a glass coating that is capable of being smoothed to a flatness that meet specifications for a diaphragm-based manometer may be utilized to provide for the principles of the present invention. Conductive elements 204 may be utilized to provide pressure sensing capabilities by having parasitic capacitive couplings 206a-206n (collectively 206) between the conductive elements 204, as further describe herein. The parasitic capacitive couplings 206 provide for electrostatic interference between the conductive elements 204. As air molecules hit the diaphragm 208, which causes pressure 210 on the diaphragm 208, the diaphragm 208, which has its weakest point in the center of the diaphragm 208, is deflected in the center in a parabolic manner, thereby causing the parasitic capacitive couplings 206 to be interfered with in the center of the conductive elements 204.

Conductors lines 212a and 212b may have + phase and − phase signals applied to the conductor lines 212a and 212b, respectively. The + phase signal is shown to be on conductor line 212a, which may be connected to conductor elements 204 in the center of the phase lines 204. When the pressure 210 deflects or displaces the diaphragm 208 in the center of the conductive elements 204 to cause center parasitic capacitive couplings to be electrostatically interfered with, a sense line 214 that is connected to one of the conductive elements 204 that is parasitically capacitively coupled with both the conductive element that has the + phase signal applied thereto in the center of the conductor elements 204 and − phase signal in the outer region of the conductor elements 204 collects a higher number of charges from the − phase signal when the pressure 210 increases on the diaphragm 208.

With regard to FIG. 3, a schematic block diagram of illustrative sensor circuitry that includes both drive circuitry and sense circuitry is shown. In addition, a first conductive element 302a, second conductive element 302b, and third conductive element 302c are shown. Each of conductive elements 302a are different parts of a single conductive element. The same holds true for conductive elements 302b and 302c. Parasitic capacitive coupling 304a and 304b are shown between the first conductive element 302a and conductive element 302c and the second conductive element 302b and conductive element 302c. The third conductive element 302c is interdigitated with conductive elements 302a and 302b (See, FIG. 4).

An oscillator 306 is configured to generate an oscillatory signal, such as a square wave. An oscillator signal 310, which is a + phase signal, is communicated onto conductor line 312. The oscillator signal 310 is also communicated to inverter 308, which applies an inverted oscillator signal or − phase signal 314 onto conductor line 316. Conductor line 312 is in electrical communication with conductive element 302a and conductor line 316 is in electrical communication with conductive element 302b. A conductor line 318 is in electrical communication with conductive element 302c, and configured to receive charges 320 that are collected by the conductive element 302c from the parasitic capacitive coupling 304b with conductive element 302b. A differential signal 322, which is generated by the charges 320, is a lower amplitude signal than the inverted oscillator signal 314 and matches phase and frequency of the inverted oscillation signal 314 as a result of the parasitic capacitive coupling 304b.

A sensor circuit 324 may be configured to receive the differential signal 322 for processing and outputting an output signal 326 onto an output line 328. In one embodiment, the sensor circuit 324 is configured to generate the output signal at a full scale pressure (FSP) amplitude in response to maximum pressure being applied to the diaphragm and no signal in response to the diaphragm being at a null position when pressure in the vacuum is at a steady state pressure. The output signal 326 may be communicated and used by a controller (not shown) of a vacuum chamber, such as a mass flow controller, for use in maintaining or adjusting environmental parameters (e.g., temperature and pressure) in the vacuum chamber being sensed by the manometer.

With regard to FIG. 4, an illustrative set of conductive elements 400 is shown. In this embodiment, three conductive elements are used. A − phase feed-through conductor 402, + phase feed-through conductor 404, and sense line feed-through conductor 406 are shown to be connected to three different conductive elements or trace lines. The traces lines include − phase conductive element 408 that includes a linear portion extending radially inward from the − phase feed-through conductor 402 and curved portions 408a-408n that extend from the linear portion of the − phase conductive element 408. A + phase conductive element 410 has a linear portion that extends radially outward from the + phase feed-through conductor 404 in the center of the conductive elements 400 and has curved portions 410a-410n that extend from the linear portion of the + phase conductive element 410. A sense line conductive element 412 has a linear portion that extends radially inward from the sense line feed-through conductor 406 and has curved portions 412a-412n that extend from the linear portion of the sense line conductive element 412.

The curved portions 412a-412n may be interdigitated with the curved portions 408a-408n of the − phase conductive element 408 and curved portions 410a-410n of the + phase conductive element 410. This interdigitization of the curved portions of the conductive elements 408, 410, and 412 provides for the parasitic capacitive coupling between (i) the − phase conductive element 408 and sense line conductive element 412, and (ii) the + phase conductive element 410 and sense line conductive element 412. As the + phase conductive element 410 is positioned toward the center of the conductive elements 400 with respect to the − phase conductive element 408, when a diaphragm (not shown) is displaced toward the conductive elements 400 in the center region above the conductive elements 400, the parasitic capacitive coupling between the + phase conductive element 410 and sense line conductive element 412 is disturbed, thereby causing the parasitic capacitive coupling between the + phase conductive element 410 and sense line conductive element 412 to be reduced. When the parasitic capacitive coupling of the + phase conductive element 410 and sense line conductive element 412 is reduced, the sense line conductive element 412 receives more charges from the − phase conductive element 408 than from the + phase conductive element 410.

Figure 5:
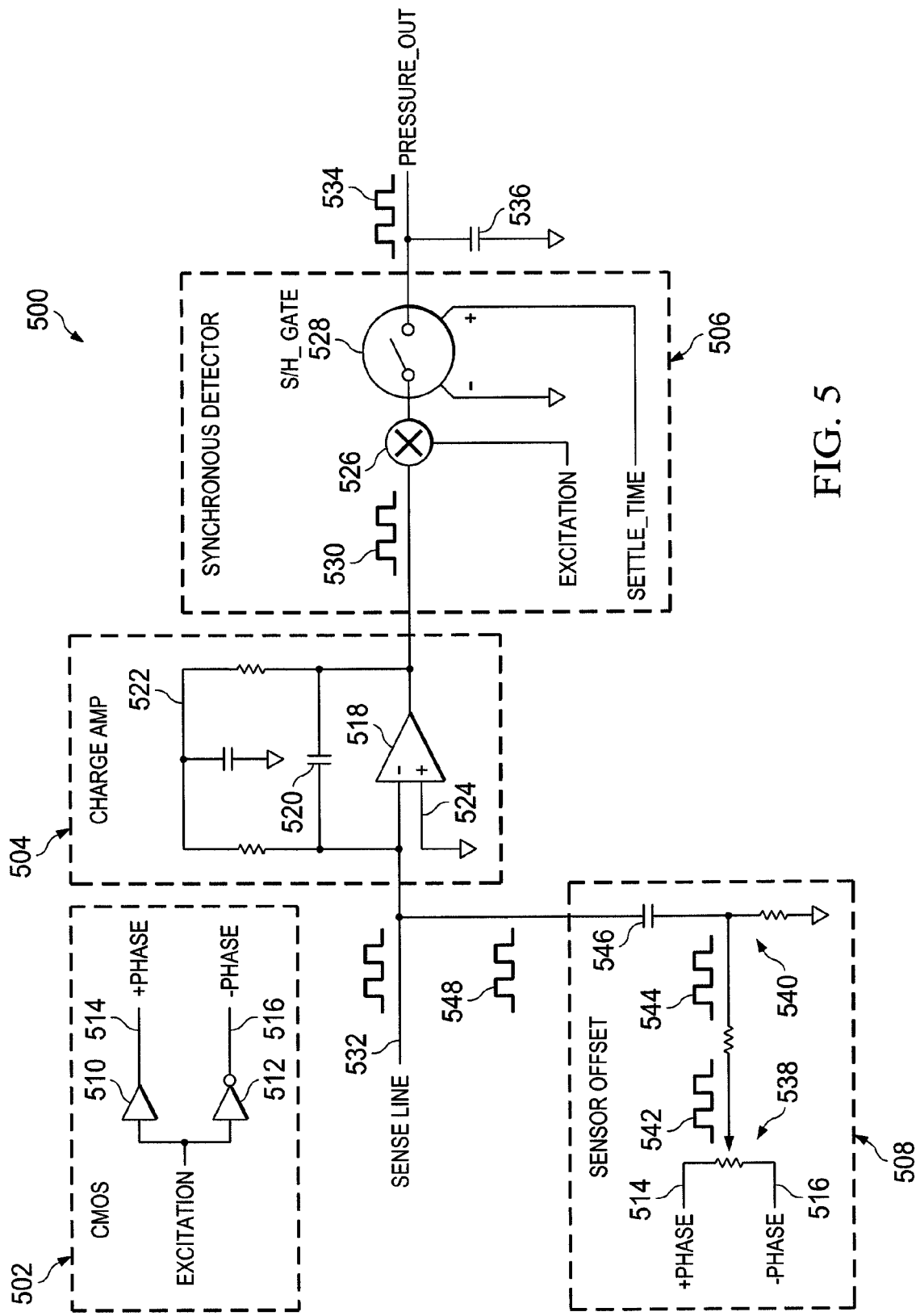
FIG. 5 is an electrical schematic of an illustrative circuit used in driving and sensing conductor elements, such as those shown in FIG. 4, for sensing pressure changes by a diaphragm-based manometer.

With regard to FIG. 5, a schematic of illustrative sense circuitry 500 is shown to include excitation circuitry 502, a charge collector 504, a synchronous detector 506, and sensor offset circuitry 508. The excitation circuitry 502 may include an oscillator (not shown) that is configured to generate an oscillatory signal, such as a square wave, and a buffer 510 and inverter 512 to generate a + phase signal 514 and − phase signal 516, respectively.

The charge amplifier 504 may include an op amp 518 and capacitor 520, which combine to operate as an integrator to integrate or sum current or charges being applied to the op amp 518. A DC feedback path 522 may be configured to maintain a DC portion of the feedback stable to prevent the op amp 518 from becoming saturated in either a positive or negative side. A ground line 524 connected to the positive input terminal of the op amp 518 may be used to eliminate or reduce shielding from a substrate of the sensor from stray capacitance. In one embodiment, the ground line 524 is connected to the base of the manometer, as shown in FIG. 6.

The synchronous detector 504 may include a multiplier 526 and sample and hold component 528 to synchronize the excitation (+ phase signal 514) and output signal 530 from the charge amp 504, which, as a result of the inverted op amp 518 being used, is positively phased. The sample and hold component 528 may measure a value of the sense line 532 to generate a pressure signal or output signal 534 that may be filtered using capacitor 536.

The sensor offset circuitry 508 may include a potentiometer 538 that is configured to be adjusted to balance the + phase signal 514 and − phase signal 516. A voltage divider 540 may be utilized to substantially reduce amplitude of a first stage offset signal 542 from the potentiometer 538 by a couple of orders of magnitude to generate a second stage offset signal 544. By reducing the magnitude of the first stage offset signal 542, a capacitor 546 may be chosen to be significantly large enough (e.g., between approximately 5 and approximately 10 pico Farads) to remove leakage capacitance and leakage currents that would otherwise be passed into the sense line 532. A second stage offset signal 544 is output from the voltage divider 540 and results in a third stage offset signal 548 after passed across the capacitor 546.

Figure 6:
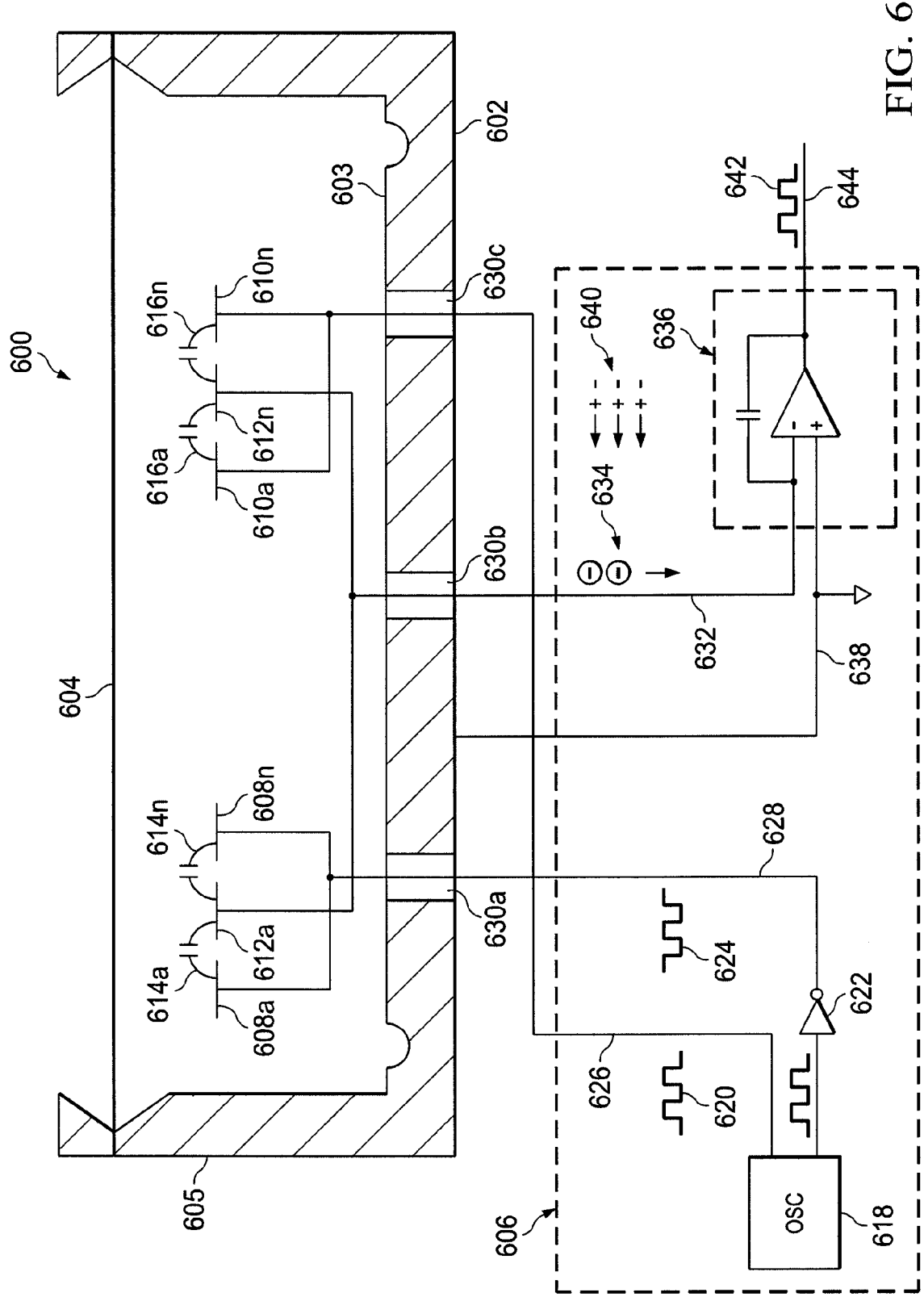
FIG. 6 is an illustration of an illustrative manometer showing portions of sensor circuitry, base, and conductive elements for use in sensing changes in pressure by the manometer.

With regard to FIG. 6, an illustration of a portion 600 of a manometer is shown. The portion 600 of the manometer is shown to combine multiple aspects of the portions from previous figures to summarize functionality of the manometer in accordance with the principles of the present invention. A base 602 is shown to have a top surface 603 above which a diaphragm 604 is shown to be connected to a sidewall 605 of the base 602. Circuitry 606 is also provided and is shown to be in communication with conductive elements 608a-608n, 610a-610n, and 612a-612n, where each of the conductive elements 608a-608n, 610a-610n, and 612a-612n are interdigitated "fingers" of respective conductive elements. The conductive elements 608a-608n, 610a-610n, and 612a-612n are illustrative in that the actual conductive elements would be disposed on the top surface 603 of the base 602 in a format as illustrated in FIG. 4, for example. Between the conductive elements 608a-608n and 612a are parasitic capacitive couplings 614a-614n that allow charges from the conductive elements 608a-608n to be collected by the conductive element 612a. Similarly, conductive elements 610a-610n and 612n have parasitic capacitive couplings 616a-616n therebetween to enable the conductive element 612n to receive charges from the conductive elements 610a-610n when a signal is applied thereto (e.g., oscillating signal).

In operation, oscillator 618 generates an oscillating signal 620 and inverter 622, which is connected to the oscillator 618, causes the oscillating signal 620 to be inverted to become an inverted oscillating signal 624. Conductor line 626 is connected to conductive elements 610a-610n to apply the oscillating signal 620 thereto, and conductor line 628 is in electrical communication with conductive elements 608a-608n to allow the inverted oscillating signal 624 to be applied to the conductive element 608a-608n. Glass feed-throughs 630a-630c are extended through the base 602 to enable the conductor lines 626 and 628 to be in electrical communication with conductive elements 610a-610n and 608a-608n, respectively. In addition, a conductor line 632, which is in electrical communication with conductive elements 612a-612n via glass feed-through 630b, receives charges 634 for input into sensor circuitry 636. Ground line 638 may also be connected to the sensor circuitry 636 and to base 602. As such, stray capacitance 640, which is inherent in any system, but particularly relevant with manometers, is mitigated in its effect. By using the ground line 638, coaxial cables that are generally used in conventional manometers to prevent stray capacitance from affecting measurements by the manometer may be eliminated. The sensor circuitry 636 may output a sensor signal 642 on output line 644.

Figure 7:
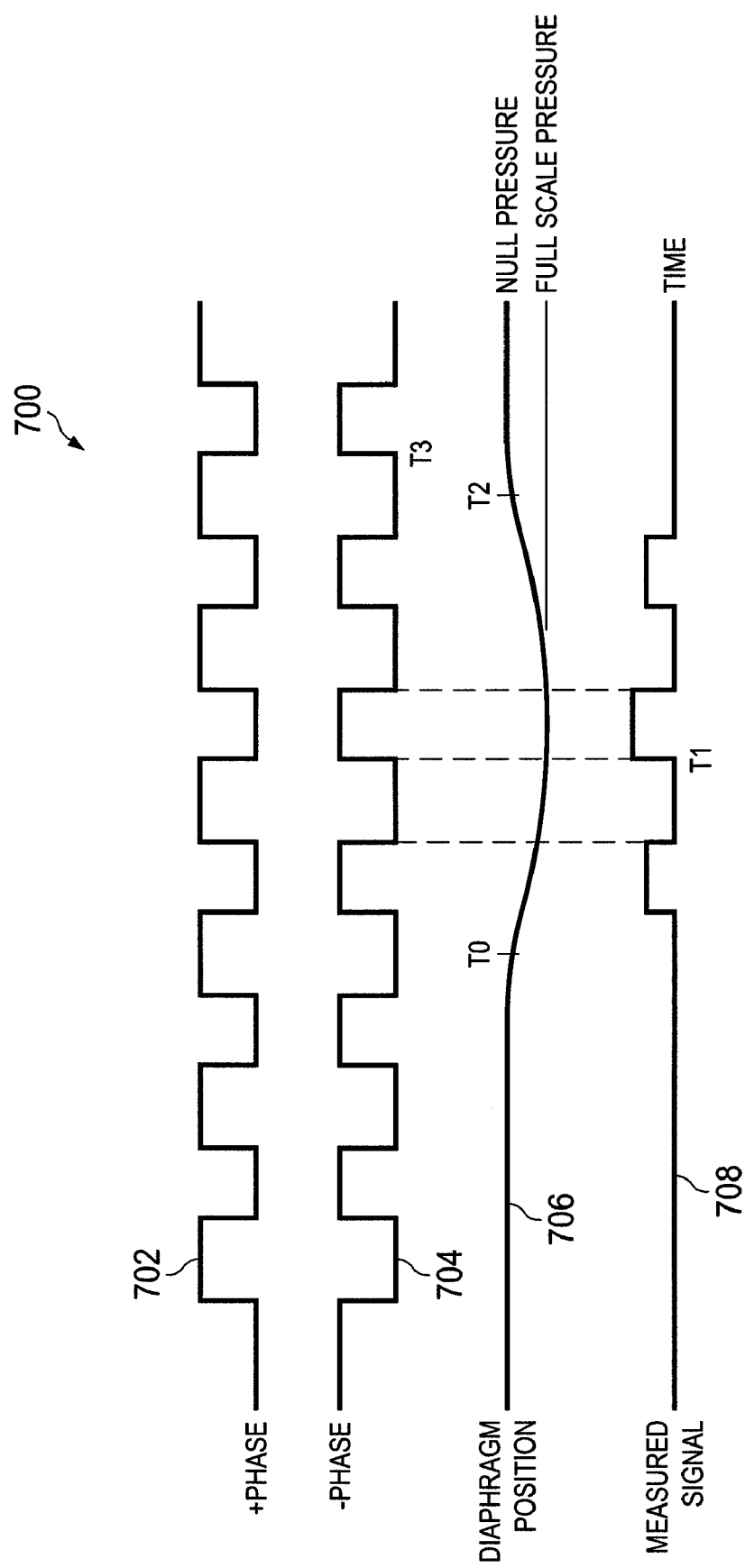
FIG. 7 is a signal diagram showing illustrative dryer signals and measured signal based on diaphragm position of a diaphragm-based manometer in accordance with the principles of the present invention.

With regard to FIG. 7, a + phase signal 702 and − phase signal 704 are shown to be synchronized with one another. A diaphragm position curve 706 is also shown. At time T0, the diaphragm position curve 706 is shown to move from a null position as pressure is applied to the diaphragm. As the diaphragm is increased in position from a null position by pressure being applied to the diaphragm, the diaphragm eventually reaches a full-scale pressure position, which causes a measured signal 708 to reach a maximum amplitude that corresponds with the − phase signal at time T1. As the pressure reduces on the diaphragm, the diaphragm position curve 706 is shown to return to a null pressure at time T2, which causes the measured signal 708 to be to zero at time T3.

With regard to FIGS. 8A-8E, a flow chart of an illustrative manufacturing process and manometer configuration at the manufacturing process stage are shown. With regard to FIG. 8A, the process starts at step A, where a machined base 800a is received. The machined base 800a may be the base itself or be a base that has some amount of processing already performed. The machined base 800a may be metallic or metal alloy. By being machined, cost may be reduced as compared to alternative base materials, such as ceramic. The machined base 800a is shown to have glass feed-throughs 802a-802c installed at step B. The glass feed-throughs 802a-802c may include conductors 804a-804c, respectively. The glass feed-throughs 802a-802c extend through openings defined by a mesa 806 of the machined base 800a. In one embodiment, the glass feed-throughs are applied to the base 800a after receiving. At step C, the machined base 800a may be fired or heated such that microscopic crystals in the machined base 800a are released, which reduces deformation due to heating and cooling cycles when operating in a manometer.

With regard to FIG. 8B, at step D, a glass coating 808 is applied to a top surface of the mesa 806 of the base 800b. The glass coating 808 may be applied as a tape casting, which is a mix of glass in a slurry form with organic binders that are formed into a sheet. Other forms of glass, including liquid glass or any other glass form, may be applied, as shown in FIG. 8B.

With regard to FIG. 8C, at step E, the applied glass may be ground to become flat to produce a flat glass surface 808' on the base 800c. With the grinding of the glass 808, the glass feed-throughs 802a-802c are also ground. In addition, the conductors 804a-804c, too, are ground such that the glass coating 808', glass feed-through or flit 802a-802c, and conductors 804a-804c become coplanar.

Figure 8:
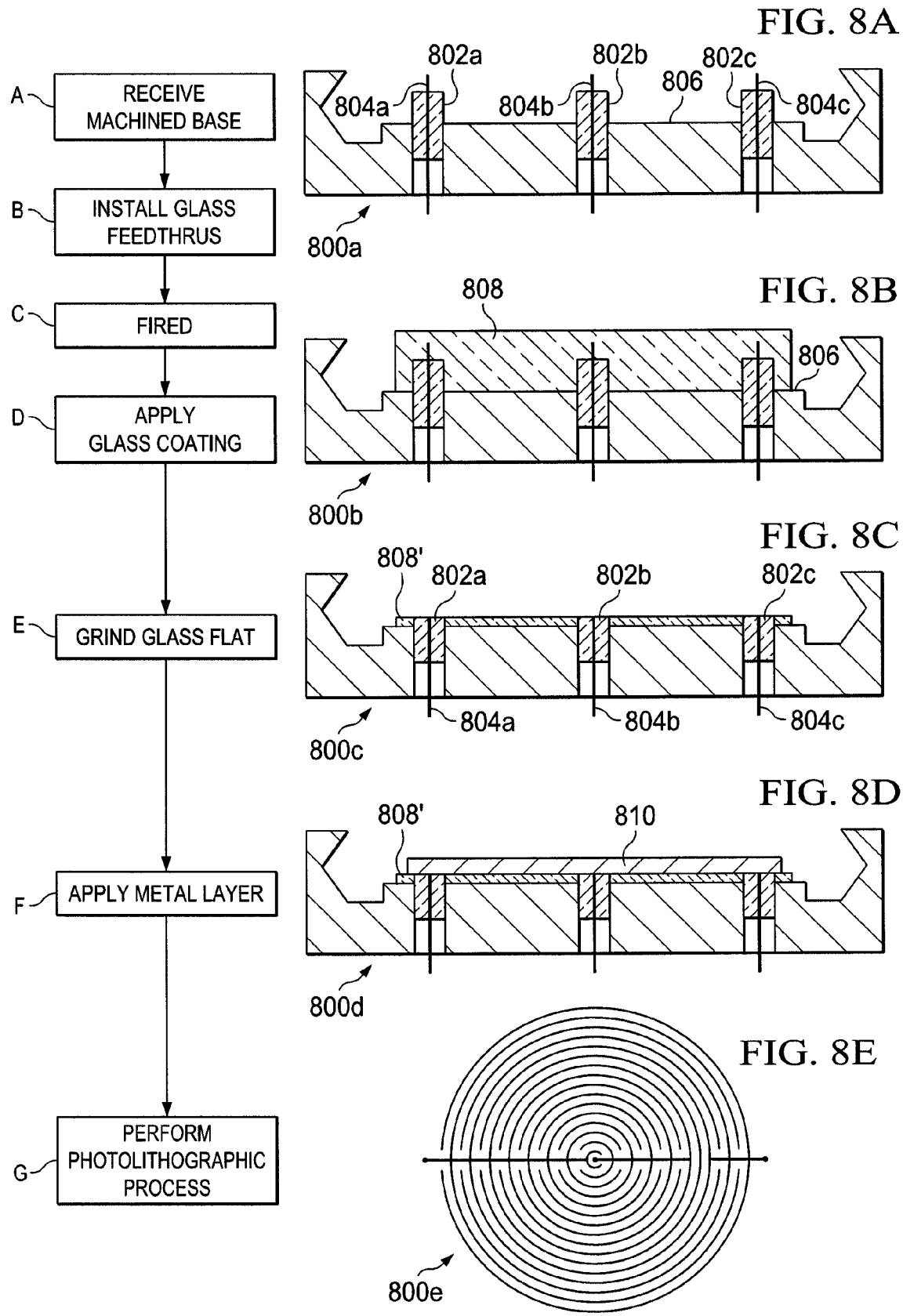
FIGS. 8A-8E (collectively FIG. 8) are illustrations of different stages of manufacturing a diaphragm-based manometer in accordance with the principles of the present invention.

With regard to FIG. 8D, at step F, a metal layer 810 may be applied over the glass layer 808'. The metal layer 810 may be deposited using a vapor deposition process, such as one used in the production of semiconductor chips. At step G, a photolithographic process may be performed to produce trace lines that are conductive elements, as described herein (see FIG. 4). The photolithographic process may include etching and other processes that are used in the production of semiconductor chips, as understood in the art. The manufacturing process described in FIG. 8 allows for mass production of manometers, as each of the bases of the manometers may be placed in a single tray and the manufacturing operations may be performed on multiple manometers simultaneously.

Figure 9:
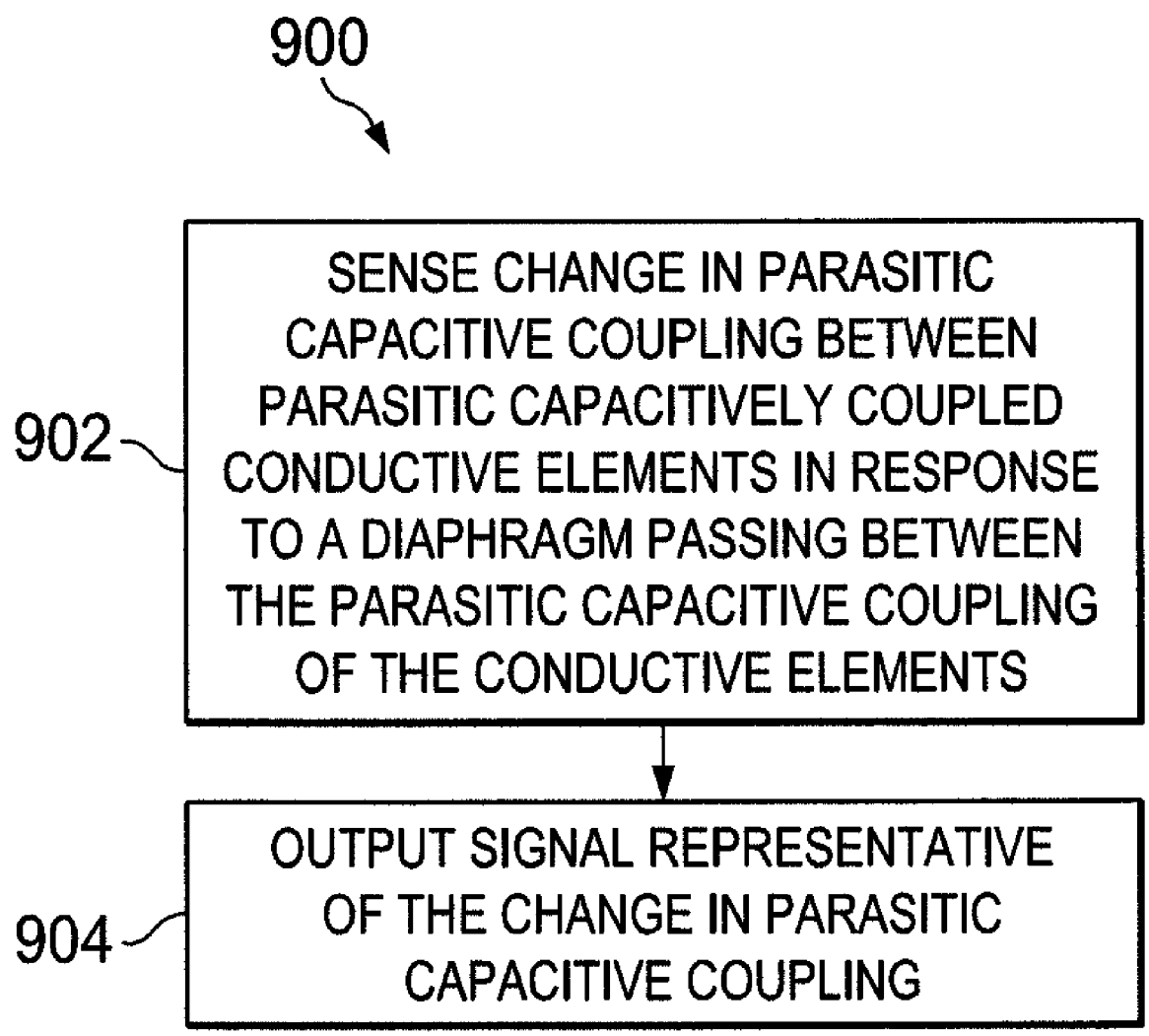
FIG. 9 is a flow diagram of an illustrative process for operation of a diaphragm-based manometer for sensing pressure changes in accordance with the principles of the present invention.

With regard to FIG. 9, a flow diagram 900 of an illustrative process for operation of a manometer in accordance with the principles of the present invention is shown. At step 902, a change in parasitic capacitive coupling between parasitic capacitive coupled conductive elements in response to a diaphragm disturbing the parasitic capacitance coupling between the conductive elements may be sensed. In disturbing the parasitic capacitance coupling, an electrostatic field that creates the parasitic capacitance coupling may be altered by the diaphragm entering the field. The sensing may cause charges to be sensed from a sense line by a sense circuit. At step 904, a signal representative in the change in parasitic capacitive coupling may be output from the manometer.

It should be understood that the description and drawings are illustrative and that alternative structure and processes may be utilized to perform the same or analogous functionality in accordance with the principles of the present invention. For example, alternative circuitry may be utilized to change phase or types of signals, but result in the same output. Still yet, different trace line configurations of the conductive elements may be utilized and, optionally, compensated for by the circuitry. In addition, alternative manufacturing processes may be utilized to produce a diaphragm-based manometer in accordance with the principles of the present invention.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A vacuum manometer, comprising:
    a base including a side wall extending higher than a center portion including a top surface and a bottom surface;
    a plurality of conductors extending through openings defined by the center portion of said base;
    a glass coating attached to at least a portion of the top surface of said base;
    a plurality of conductive elements disposed on said glass coating and in electrical communication with said electrical conductors; and
    a diaphragm connected to the side wall and extending over said conductive elements.

2. The vacuum manometer according to claim 1, wherein said conductive elements are vapor deposition deposits on said glass coating.

3. The vacuum manometer according to claim 1, further comprising a plurality of glass feed-throughs connecting to inside surfaces of the openings through which said conductive conductors respectively pass, the glass feed-throughs providing vacuum tight seals.

4. The vacuum manometer according to claim 1, wherein there are three electrical conductors.

5. The vacuum manometer according to claim 4, further comprising circuitry in electrical communication with said three conductors, said circuitry configured to (i) drive two of said conductors with respective alternating electrical signals that are opposite in phase and have substantially the same amplitude, and (ii) receive a net charge induction signal in response to said diaphragm moving.

6. The vacuum manometer according to claim 5, wherein said circuitry is configured to collect charge in response to said diaphragm interfering with parasitic capacitive coupling between two of the conductive elements in electrical communication with the two conductors on which the alternating electrical signals are being driven.

7. The vacuum manometer according to claim 5, wherein said conductive elements include three interdigitated conductive elements.

8. The vacuum manometer according to claim 7, wherein:
    a first interdigitated conductive element extends in substantially circular directions from a first linear conductive strip extending radially inward from a first one of said conductors extending through said base;
    a second interdigitated conductive element extends in substantially circular directions from a second linear conductive strip extending radially outward from a second one of said conductors extending through said base; and
    a third interdigitated conductive element extends in substantially circular directions from a third linear conductive strip extending radially inward from a third one of said conductors extending through said base.

9. The vacuum manometer according to claim 8, wherein one of the two conductors with alternate electrical signals is connected to the first interdigitated conductive element, the other of the two conductors with alternate electrical signals is connected to the second interdigitated conductive element, and the third conductor is connected to the third interdigitated conductive element.

10. The vacuum manometer according to claim 1, wherein said base is metallic.

11. A method of sensing pressure changes, said method comprising:
    sensing a change in parasitic capacitive coupling between a plurality of parasitic capacitive coupled conductive elements in response to a diaphragm disturbing the parasitic capacitive coupling between the conductive elements; and
    outputting a signal representative of the sensed change in parasitic capacitive coupling.

12. The method according to claim 11, wherein sensing includes collecting a differential charge in response to the diaphragm crossing an electrostatic field that provides for the parasitic capacitive coupling between the conductive elements.

13. The method according to claim 11, wherein sensing includes sensing a differential change in the parasitic capacitive coupling between (i) a first signal line and a sense line and (ii) a second signal line and the sense line.

14. The method according to claim 11, further comprising blocking stray capacitance by using a ground line for circuitry configured to perform said sensing.

15. The method according to claim 11, further comprising:
    applying a first oscillating signal onto a first conductive element of the conductive elements;
    applying a second oscillating signal onto a second conductive element of the conductive elements, the second oscillating signal being 180 degrees out of phase from the first oscillating signal; and
    wherein sensing includes collecting charge as a result of more positive parasitic capacitive coupling being disturbed than negative parasitic capacitive coupling.

16. A vacuum manometer, comprising:
- a monolithic base having a top surface and side wall extending higher than the top surface;
- a plurality of conductive elements supported by the top surface of said base;
- a diaphragm connected to the side wall of said monolithic base and positioned above said conductive elements with respect to the top surface of said monolithic base; and
- an enclosure configured to cover said base above said diaphragm.

17. The vacuum manometer according to claim 16, further comprising a glass layer connected to said monolithic base, and wherein said conductive elements are connected to said glass layer.

18. The vacuum manometer according to claim 16, further comprising an electrical circuit connected to said conductive elements and configured to sense a change in parasitic capacitive coupling between conductive elements in response to said diaphragm moving in response to a change in pressure.

19. The vacuum manometer according to claim 18, where in said monolithic base is configured to enable said electrical circuit to produce the substantially same measurement when said base is a given temperature after one or more thermal cycles.

20. An electrical circuit for measuring pressure changes on a vacuum manometer, said electrical circuit comprising:
- an oscillator generating an oscillating signal;
- an inverter electrically connected to said oscillator, and configured to invert the oscillating signal being generated by said oscillator;
- a first conductive element in electrical communication with said oscillator, the oscillating signal being applied to said first conductive element;
- a second conductive element in electrical communication with said inverter, the inverted oscillating signal being applied to said second conductive element;
- a third conductive element being in parasitic capacitive coupling with said first and second conductive elements; and
- sensor circuitry in electrical communication with said third conductive element, and configured to measure charge on said third conductive element.

21. The electrical circuit according to claim 20, wherein said sensor circuitry includes a charge amplifier circuit configured to generate a voltage in response to receiving charges from said third conductive element.

22. The electrical circuit according to claim 20, wherein said sensor circuitry is grounded to a base of the vacuum manometer, and wherein said sensor circuitry is guarded from stray capacitance by the ground.

23. The electrical circuit according to claim 20, wherein said sensor circuitry includes sensor offset circuitry in electrical communication with said oscillator and said inverter, and configured to receive the oscillating signal as a first input signal and the inverted oscillating signal as a second input signal, said sensor offset circuitry including:
- a variable adjustment circuit element configured to enable a user to variably adjust between the first and second input signals to generate a first stage offset signal;
- a voltage divider configured to reduce signal level of the first stage offset signal to generate a second stage offset signal; and
- a capacitive element electrically connected to said voltage divider and configured as a differentiating element to ensure that a third stage offset signal is of appropriate phase, the third stage offset signal being applied to an input signal line of said sensor circuitry connected to said third conductive element.

24. The electrical circuit according to claim 20, wherein said sensor circuitry includes:
- a synchronous detected circuit including a multiplier having a first input line and a second input line, the first input line receiving a charge voltage signal from a charge collector circuit of said sensor circuitry and the second input line receiving the oscillating signal from said oscillator, the multiplier multiplying the charge voltage signal and oscillating signal to generate a synchronous detected signal; and
- a sample and hold circuit configured to generate a detected signal representative of a pressure change at the manometer.

25. A method of manufacturing a vacuum manometer, said method comprising:
- receiving a base having a top surface and a plurality of conductors extending through the base and above the top surface of the base;
- applying a glass coating onto the top surface of the base;
- flattening the glass coating to form a flat glass surface, the flattening causing the conductors to be altered such that respective exposed portions of the conductors are substantially co-planar with the flat glass surface; and
- applying a plurality of conductive elements onto the flat glass surface, the conductive elements being connected to respective conductors.

26. The vacuum manometer according to claim 25, further comprising flattening the top surface of the base prior to applying the glass coating.

27. The vacuum manometer according to claim 25, wherein applying the glass coating includes:
- placing a glass material onto the top surface of the base; and
- heating the base and glass material to cause the glass material to flow; and
- cooling the glass.

28. The vacuum manometer according to claim 25, wherein applying the conductors onto the flat glass surface includes using a photolithographic process to define trace lines of the conductors.

29. The vacuum manometer according to claim 25, wherein applying the conductors includes applying three, interdigitated conductors to the flat glass surface.

30. The vacuum manometer according to claim 25, further comprising assembling glass feed-throughs including the conductors extending, and wherein flattening the glass coating includes flattening at least a portion of the glass feed-throughs to cause top surfaces of the glass feed-throughs to be substantially co-planar with the flat glass surface.

* * * * *